United States Patent [19]

Kanai et al.

[11] 4,176,628

[45] Dec. 4, 1979

[54] COMBUSTION CHAMBER FOR AN INTERNAL COMBUSTION ENGINE OF DIRECT INJECTION TYPE

[75] Inventors: Seikichi Kanai; Kunihiko Komiyama, both of Oyama, Japan

[73] Assignee: Kabushiki Kaisha Komatsu Seisakusho, Tokyo, Japan

[21] Appl. No.: 851,174

[22] Filed: Nov. 14, 1977

[30] Foreign Application Priority Data

Nov. 12, 1976 [JP] Japan .................... 51/135424

[51] Int. Cl.² ............................................. F02B 23/06
[52] U.S. Cl. ................. 123/32 A; 123/32 R; 123/32 ST; 123/193 P
[58] Field of Search ............. 123/32 A, 32 R, 32 ST, 123/193 P

[56] References Cited

U.S. PATENT DOCUMENTS

| 3,814,068 | 6/1974 | Kimbara | 123/32 A |
| 3,872,841 | 3/1975 | Kimbara | 123/32 A |
| 3,892,221 | 7/1975 | Kimbara | 123/32 ST |
| 3,945,351 | 3/1976 | Kimbara | 123/32 ST |

FOREIGN PATENT DOCUMENTS 49-16881 4/1974 Japan .

Primary Examiner—Alan Cohan
Attorney, Agent, or Firm—Armstrong, Nikaido, Marmelstein & Kubovcik

[57] ABSTRACT

A combustion chamber for an internal combustion engine of the direct injection type formed by a cylinder head, a cylinder liner and a piston head, the piston head having formed therein a cavity in which air swirl can be produced by a known device. Fuel injection nozzles are disposed substantially in the central part of said cavity for injecting jets of fuel radially against the cavity wall. Said cavity comprises a generally toroidal cavity formed in said piston head and a plurality of corner cavities formed continuously to said toroidal cavity, each of said corner cavities being defined by a generally linear wall tangent to the inner peripheral wall of said toroidal cavity and a generally semi-circular wall interconnecting said linear wall and the inner peripheral wall of said toroidal cavity, said linear wall being formed upstream side of said air swirl.

3 Claims, 7 Drawing Figures

COMBUSTION CHAMBER FOR AN INTERNAL COMBUSTION ENGINE OF DIRECT INJECTION TYPE

BACKGROUND OF THE INVENTION

This invention relates to a combustion chamber for internal combustion engines of the direct injection type, and more particularly to a combustion chamber which can reduce the level of noise (hereinafter referred to as the noise generated by combustion) and can also reduce the amount of nitrogen oxide (hereinafter referred to as NOx).

It is well known in the field of the art that in internal combustion engines if the timing of injection of fuel into the combustion chamber is delayed to some extent so as to reduce the explosion pressure and the rate of increase thereof the level of the noise generated by fuel combustion can be reduced and at the same time the combustion gas temperature can be lowered thereby reducing the amount of NOx.

However, there encounters a difficulty that in general when the timing of fuel injection is delayed the thermal efficiency of the Diesel cycle will be lowered so as to increase the fuel consumption rate, and so imperfect combustion is caused thereby producing black exhaust gas or smoke.

Stated in brief, the fuel consumption rate is a function of $dM/dt \cdot S \cdot Tm \cdot Td \cdot d\theta/dt$, and in the similar manner the color of exhaust gas, NOx, the noise generated by combustion are a function of $dM/dt \cdot S \cdot Tm \cdot Td \cdot d\theta/dt$, respectively.

A delay in injection timing serves to reduce an ignition lag Td, and therefore as a mean cycle gas temperature Tm and a heat generation coefficient $d\theta/dt$ are reduced the velocity of mixing fuel and air $dM/dt$ and the time and space distribution "S" of mixing ratio will be reduced.

Accordingly, if the timing of fuel injection is delayed the level of noise generated by fuel combustion and the amount of NOx can be reduced; however, the fuel consumption rate will be increased thereby generating black exhaust gas or smoke based on the above-mentioned relationship.

In order to eliminate such difficulty it is only necessary to increase the air and fuel mixing speed $dM/dt$ at the time of delaying the fuel injection timing or increase the combustion speed after the fuel ignition. Stated more specifically, the emission of black exhaust gas and increase in fuel consumption rate are due to the fact that the combustion process is maintained even after the piston has reached its top dead centre, and so in order to eliminate the above-mentioned disadvantage, it is necessary to increase the combustion speed thereby shortening the combustion period. In the conventional combustion chamber having a toroidal cavity formed in a piston head, in order to achieve a good combustion of fuel injected from fuel injection nozzles, pertinent combination of fuel injection angles in lateral and vertical directions with speed of air swirl can be selected.

In order to increase the combustion speed, it is required to increase the air flow (in particular, the air flow after the fuel ignition) within the combustion chamber.

The term "air flow" employed herein is meant by a large swirl motion generated in the combustion chamber and a resultant turbulence of a small scale.

To produce the above-mentioned air flow, there is conventionally provided a quadrilateral combustion chamber having a quadrilateral cavity formed in the upper part or top of a piston.

The combustion chamber of this form enables air turbulences of a small scale to be produced by a large air swirl motion in the corner square parts thereof so that a strong air flow can be produced therein.

However, the combustion chamber of such shape is disadvantageous in that the intensity of the turbulence of a small scale generated in the corner square parts and that of the large swirl are contrary to each other. In brief, if radius "R" of the corner square parts is comparatively smaller than radius "Ro" of the inscribed circle of the quadrilateral cavity (if the ratio R/Ro is reduced) the intensity of air turbulences of a small scale generated in the corner square parts can be increased; therefore the intensity of the large air swirl motion will be reduced. If the ratio R/Ro is increased, the intensity of the large air swirl can be increased, whilst the air turbulence of a small scale generated in the corner square parts will be reduced.

In any case, the combustion chamber of the conventional shape cannot afford increased turbulences of a small scale and the large air swirl motion at the same time, and further the turbulences can be produced only in the corner square parts so that a sufficiently large air flow cannot be produced therein.

SUMMARY OF THE INVENTION

It is therefore an object of the present invention to provide a combustion chamber having a toroidal cavity and a plurality of corner cavities formed continuously to said toroidal cavity in the piston head which is capable of producing an excellent combustion process.

Another object of the present invention is to provide a combustion chamber wherein a large air swirl and a plurality of small air turbulences can be produced in the combustion chamber so as to attain an improved mixing of the fuel and air.

In accordance with an aspect of the present invention, there is provided a combustion chamber for use in an internal combustion engine of the direct injection type, which is defined by a cylinder head, a cylinder liner and a piston head, the piston head having formed therein a cavity in which the air swirl can be produced by known means. Said cavity comprises a generally toroidal cavity formed in the piston head and a plurality of corner cavities formed continuously to said toroidal cavity. Fuel injection nozzles are disposed substantially in the central part of said cavity for injecting jets of fuel radially against the cavity wall.

Each of said corner cavities is opposed against each of said fuel injection nozzles and is adapted to receive jets of fuel injected from said fuel injection nozzles. Said each corner cavity is defined by a generally linear wall tangent to the inner peripheral wall of said toroidal cavity and a generally semicircular wall interconnecting said linear wall and the inner peripheral wall of said toroidal cavity, said linear wall being formed upstream side of said air swirl. Air turbulences can be produced in said corner cavities which contribute to improve mixing of the fuel and air with the combination of the air swirl.

The above and other objects, features and advantages of the present invention will be readily apparent from the following description taken in conjunction with the accompanying drawings.

DETAILED DESCRIPTION OF THE INVENTION

Figure 1:
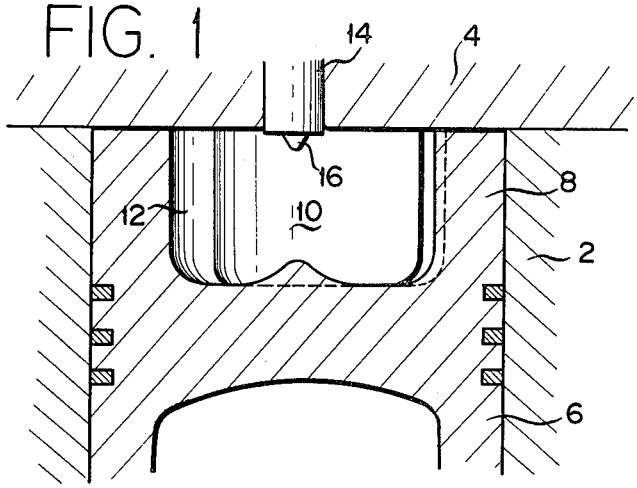
FIG. 1 is a longitudinal cross-sectional view of a combustion chamber according to the present invention.
Figure 2:
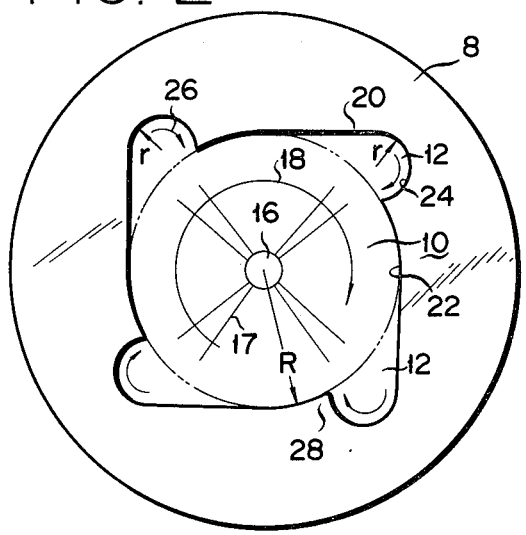
FIG. 2 is a plan view of the piston head of FIG. 1.
Figure 3:
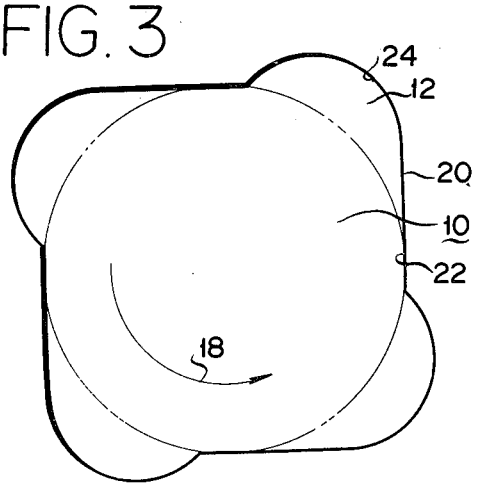
FIGS. 3 to 7 are similar to FIG. 2 but showing modified forms of the cavity according to the present invention.
Figure 4:
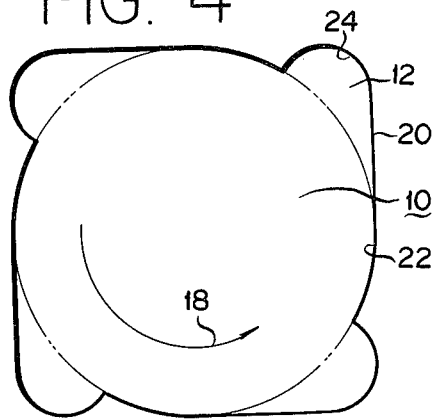
Figure 5:
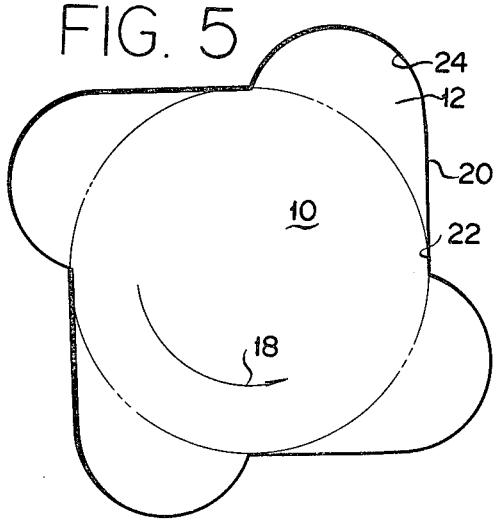
Figure 6:
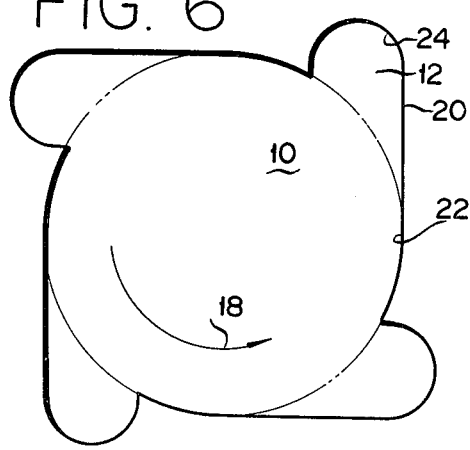
Figure 7:
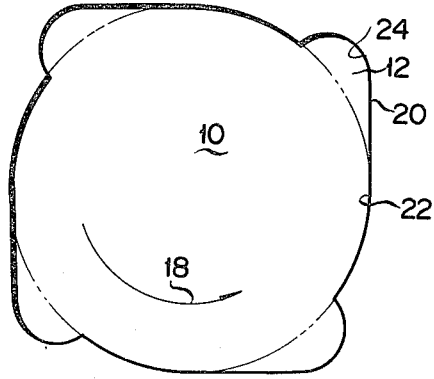

The present invention will now be described in detail with reference to the accompanying drawings. Referring to FIG. 1, reference numeral 2 denotes a cylinder liner, 4 a cylinder head. Slidably disposed within said cylinder liner 2 is a piston 6 having a piston head 8. Formed in the piston head 8 are a toroidal cavity 10 and a plurality of corner cavities 12. Fuel injection means 14 is mounted in the approximately central part of the cylinder head 4. The fuel injection means 14 has a plurality of nozzles 16 through which the fuel being injected radially against the cavity wall. The fuel injection 17 is directed to hit the cavity wall of the corner cavities 12. Therefore the numbers of corner cavities 12 are equal to those of nozzles 16. Air swirl 18 is produced in the toroidal cavity 10 by known means which is not shown. Each of the corner cavities 12 is defined by a generally linear wall 20 tangent to the inner peripheral wall 22 of the toroidal cavity 10 and a generally semi-circular wall 24 interconnecting the linear wall 20 and the inner peripheral wall 22. The linear wall 20 is positioned at the upstream side of the air swirl 18.

The ratio of the radius r of the semi-circular wall 24 of the each corner cavity 12 to that of the inner peripheral wall 22 of the toroidal cavity 10 is about 1/6 to ½ or $1/6 < r/R < \frac{1}{2}$.

Since the corner cavities 12 are formed continuously to the toroidal cavity 10 as mentioned above, part of the air swirl 18 is introduced into the corner cavities 12 along the linear walls 22 to form air turbulences 26. Further since projections 28 are formed at the boundary of the semi-circular walls 24 and the inner peripheral walls 22, air flows within the combustion chamber become more complicated and therefore the mixing of the fuel and air can be improved.

Cavity shape is not limited to exact one of the embodiment mentioned hereinabove, but modified forms shown from FIGS. 3 to 7 are considered to perform the similar functions.

While the combustion chamber in accordance with the present invention has been shown and described in terms of its specific forms, it is understood that the invention itself is not to be restricted by the exact details of this disclosure. Numerous modifications or changes will readily occur to those skilled in the art without departing from the spirit or scope of the invention as sought to be defined by the following claims.

What we claim is:

1. In an internal combustion engine of the direct injection type including combusion chambers each defined by a cylinder head, a cylinder liner, and a piston head having a wall defining a cavity therein, means for producing an air swirl in said cavity, and fuel injection means each having a plurality of fuel injection nozzles, said fuel injection means being mounted substantially at the central part of said cavity, said nozzles being arranged to inject jets of fuel into said cavity radially against said cavity wall, the improvement wherein said cavity wall is constructed to define a generally toroidal cavity formed in said piston head and a plurality of corner cavities formed continuously to said toroidal cavity, each of said corner cavities being opposed to each of said fuel injection nozzles and being adapted to receive jets of fuel injected from said fuel injection nozzles, each of said corner cavities being defined by a generally linear wall tangent to one inner peripheral wall of said toroidal cavity and a contiguous generally semi-circular wall interconnecting said linear wall with another inner peripheral wall of said toroidal cavity said another inner wall being adjacent to said one inner wall and, said linear wall being formed on the upstream side of said air swirl.

2. The engine according to claim 1 wherein the ratio of the radius of said semi-circular wall of said corner cavity to that of inner peripheral wall of said toroidal cavity is about 1/6 to ½.

3. The engine according to claim 1 wherein the periphery of the corner cavity extends beyond a quadrilateral formed by axes aligned with the peripheral walls of said toroidal cavity.

* * * * *